Jan. 3, 1967 J. L. BOSTWICK 3,295,422
SAFETY BRAKE ACTUATOR
Filed Nov. 16, 1964
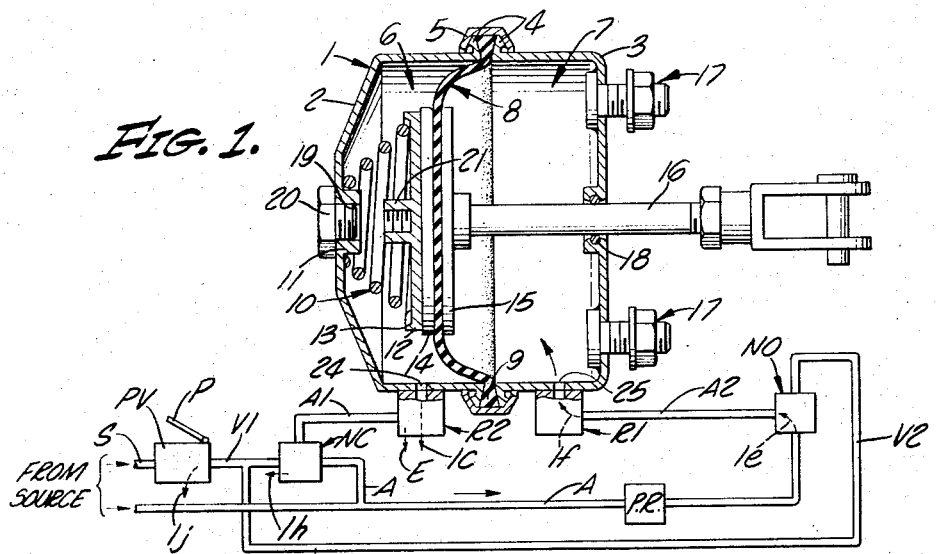
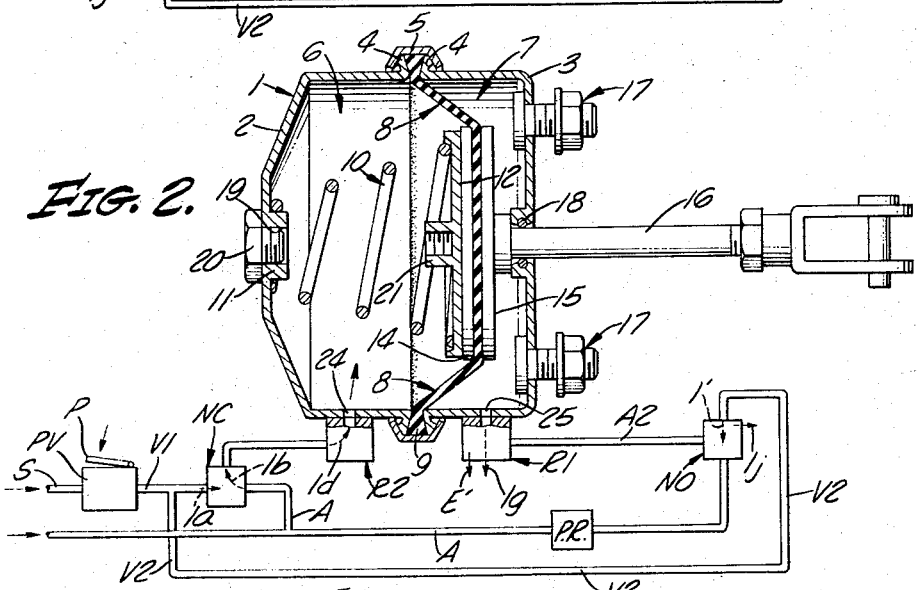
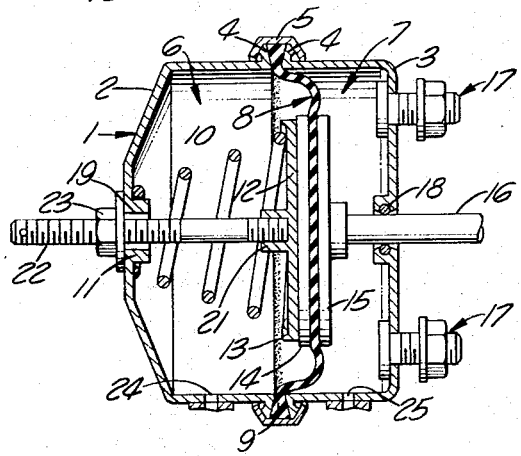
INVENTOR.
JAMES L. BOSTWICK
BY
Paul A. Weilein
ATTORNEY United States Patent Office 3,295,422
Patented Jan. 3, 1967

3,295,422
SAFETY BRAKE ACTUATOR
James L. Bostwick, 1501 Bluff Drive,
Santa Barbara, Calif. 93105
Filed Nov. 16, 1964, Ser. No. 411,267
2 Claims. (Cl. 91—446)

This invention relates to fluid pressure operated vehicle brake actuators of the safety type wherein spring means apply a force for actuating the brakes incident to failure of the fluid pressure in the brake system.

Certain safety brake actuators of the above type are known as piggy-back models, due to the construction thereof wherein there is added to a conventional brake chamber a housing mounted atop thereof and containing a heavy spring and associated elements which latter, in response to the operative fluid pressure in the system, will prevent the spring from applying a braking force but will permit the spring to apply the braking force through the conventional chamber upon failure of the operative fluid pressure in the system.

A conventional brake chamber usually consists of a two-part housing of low height divided by a diaphragm and having a brake rod operatively connected with the diaphragm for movement to apply the brakes responsive to fluid pressure on one side of the diaphragm. A spring on the other side of the diaphragm moves the latter and the brake rod for releasing the brakes when the fluid pressure to the brake chamber is intentionally shut off. In the piggy-back models the mounting of the second housing with a heavy spring and associated elements therein on top of the conventional brake chamber appreciably increases the height, weight and bulk of the unit and entails objectionable installation problems as well as renders the unit top heavy and subject to breaking loose or becoming loosened on its mounting due to vibration, with consequent likelihood of failure as a safety unit.

It is an object of the present invention to provide an improved safety brake actuator which eliminates the above noted objections attending piggy-back type actuators and operates in a reliable and efficient manner to effect service and emergency applications of the brakes without the use of a second housing and the spring and associated elements contained in the second housing, as in the piggy-back actuators.

It is another object of this invention to provide a safety brake actuator of the character described which consists of fewer parts and has less bulk and height than piggy-back type actuators, yet will serve reliably to afford service brake applications as well as an emergency application of the brakes in the event of failure of the fluid pressure in the brake system.

Another object of this invention is to provide an improved safety brake actuator wherein the spring means for effecting an emergency operation of the brakes in the event of failure of the operative fluid pressure in the brake system, also aids in applying the brakes for regular service application of the brakes with the advantage that the desired service application of the brake may be effected at a lower fluid pressure than heretofore, and yet in case of failure of the operative pressure in the system the spring means alone will be effective to provide for a safe emergency application of the brake.

An additional object is to provide an actuator such as above described wherein the spring means is held compressed and the actuator maintained in brake releasing position by fluid pressure, and wherein the spring means and the actuator are rendered operative to effect service or regular application of the brakes by introducing fluid under pressure into the chamber of the actuator in which the spring is disposed and at the same time exhausting from the actuator the pressure fluid that held the spring compressed.

An additional object is the provision of an improved safety brake actuator wherein a single housing corresponding to that of a conventional brake chamber, a movable member, for example a diaphgram, arranged to divide the housing into two chambers capable of releasably retaining fluid under pressure therein, spring means in one chamber, a brake actuator rod connected to the diaphragm and extending out from the other chamber, and means for controlling the application to said chambers of fluid under pressure and the exhausting of such fluid therefrom, constitutes a compact unit operable in a reliable and efficient manner to effect regular service application of brakes as well as emergency application in case of failure of fluid pressure in the brake system.

Other objects and advantages of the invention will be hereinafter described or will become apparent to those skilled in the art, and the novel features of the invention will be defined in the appended claims.

Referring to the drawing:

FIG. 1 is a sectional view of safety brake actuator embodying the present invention including a diagrammatic illustration of a fluid pressure control circuit therefor and showing the actuator in brake releasing position and indicating in the diagram the flow of fluid into and from the actuator necessary for releasably holding the latter in brake releasing position;

FIG. 2 is a sectional view corresponding to FIG. 1 showing the parts of the actuator in brake applying position and with the associated diagram indicating the fluid flow during the operation of applying the brakes; and FIG. 3 is a sectional view corresponding to FIGS. 1 and 2 showing means associated with the actuator for compressing the spring and maintaining it captive as required when dismantling the housing of the actuator.

A safety brake actuator embodying the present invention as shown in the accompanying drawings includes a housing 1 made up of a pair of cup-like sections 2 and 3 having flanged margins 4 clamped together by means of a conventional split ring 5 removably held in place with the usual fastening means, not shown.

Means are provided to divide the housing 1 so as to form therein a closed brake applying chamber 6 and a closed brake releasing chamber 7, such means being movable between these chambers into brake applying and brake releasing positions. As here shown, this movable means is in the form of a suitable diaphragm 8 the edges 9 of which are clamped between the flanged edges 4 and form seals at the joint of the housing sections 2 and 3.

In the brake applying chamber 6 is spring means here shown as a coiled spring 10 which at one end surrounds a boss 11 at the outer wall of this chamber and at its other end bears against a plate 12 having a marginal flange 13 to retain the spring thereon.

In the brake releasing chamber 7 is a plate 15 corresponding to the plate 14 and which bears against the diaphragm and has affixed thereto one end of a brake actuating rod 16. The plate 15 may be secured or otherwise operatively associated with the diaphragm and the rod 16 extends through the outer wall of the chamber 7 for connection in the usual manner with brake applying means. Sealing means here shown as an O-ring 18 forms a seal around the rod to prevent leakage from the chamber 7.

The housing section 3, as here shown, may be provided with the customary fastening elements 17 to facilitate the mounting of the actuator on a vehicle.

As it is sometimes necessary to separate the sections 1 and 2, for example in order to replace the diaphragm, means are provided for holding the spring 10 captive to avoid injury of the person disassembling the housing. For this purpose the boss 11 is provided with a screw threaded opening 19 extending therethrough to receive a screw threaded plug 20 that normally closes and seals chamber 6. In line with the plug on the plate 12 is a screw threaded boss 21. When it is desired to compress the spring and hold it captive while disassembling the housing, a screw threaded rod 22, as shown in FIG. 3, is inserted through the opening 19 in the boss 11 after removing the plug 20 and is turned into the screw threaded boss 21 on the plate 12. Next, a nut 23 is threaded onto the rod 22 and rotated against the outer wall of the housing section 2 so as to move the rod 22 axially and compress the spring as desired so that the spring is held captive upon disassembling the housing. After reassembling the housing with replacement or repairs that may be required, the nut is moved outwardly on the rod to allow the spring to expand and the rod is then removed from the threaded boss 21 and the plug 20 replaced.

The section 2 of the housing is provided with a port 24 and the section 3 of the housing 1 is provided with a port 25. These ports provide for the introduction of fluid under pressure into the chambers 6 and 7 as well as for the venting of these chambers to the atmosphere, in the operation of the actuator of this invention, as will be hereinafter described.

Any suitable control means and pressure fluid system may be employed for introducing fluid under pressure, in this instance compressed air, through the ports 24 and 25 and for permitting the chambers 6 and 7 to be vented to atmosphere through the ports 24 and 25, it being desired that the actuator be maintained by air pressure in brake releasing position as shown in FIG. 1. For this purpose brake releasing means is operable for venting the brake applying chamber 6 while introducing air under pressure into the brake releasing chamber 7 and maintaining the air therein until it is desired to apply the brakes. By having the actuator maintained in brake releasing position in this manner, should the air pressure in the brake system fail, the spring 10 will move the diaphragm and rod into brake applying position.

The aforementioned control means and system also includes brake applying means which is operable to introduce air under pressure into the brake applying chamber 7 through port 24 and at the same time to vent the brake releasing chamber through the port 25 so that the diaphragm and brake rod will be moved into brake applying position by the spring 10 plus the air pressure, in a regular service operation of the brakes.

As shown in the diagrams in FIGS. 1 and 2, one form of control means and compressed air system that may be employed may include as the main control element a conventional pedal-operated valve PV, the pedal P of which is in elevated position as shown in FIG. 1 when the diaphragm 8 and brake rod 16 are in brake releasing position. The pedal operated valve PV is connected by a supply line S leading from a source of supply of compressed air and when this valve is opened by depressing the pedal P compressed air will flow from the valve through lines V1 and V2 to normally closed and conventional relay valve NC and a normally open conventional relay valve NO. The lines V1 and V2 are controlled by the pedal operated valve PV for the sole purpose of actuating the relay valves NC and NO which in turn control flow of air under pressure from the source connected pressure line A leading to valves NC and NO and from these valves through lines A1 and A2 and if desired through conventional quick relief valves R1 and R2 connected to ports 25 and 24 leading into chambers 6 and 7 respectively.

When it is desired to operate the brake actuator of this invention to apply brakes and the actuator and control means therefor are in the brake releasing position shown in FIG. 1, the pedal P is depressed as shown in FIG. 2 to open the pedal valve PV. Air pressure will now flow from the pedal valve PV through line V1 and the port indicated by the arrow 1a in the normally closed valve NC to open this valve so that air pressure from line A will pass through this valve as indicated by the arrow 1b in FIG. 2, thence through line A1 to the conventional quick release valve R2 connected with port 24 for the chamber 6. The valve R2 in response to pressure from line A1 closes its exhaust passage indicated by the arrow 1c in FIG. 1 and opens its intake port indicated by the arrow 1d as shown in FIG. 2, thereby admitting air pressure into the chamber 6 through the port 24 for applying the brakes. At the same time that the brake applying air pressure is admitted as above to the chamber 6, pedal controlled air pressure in line V2 is applied through a port indicated by the arrow 1' in FIG. 2 and closes the normally open relay valve NO, thereby shutting off flow of air pressure through this valve at the port indicated by the arrow 1e in FIG. 1, as well as flow through line A2 to the quick relief valve R1. The valve R1 in the absence of pressure from line A2 and valve NO closes its intake port indicated by the arrow 1f in FIG. 1 and opens its exhaust port indicated by the arrow 1g in FIG. 2, thereby venting chamber 7 to the atmosphere. As shown in FIG. 2, when this venting of chamber 7 takes place, the air pressure in chamber 6 and the force of the spring 10 are effective to move the diaphragm 8 and rod 16 into brake applying position.

When it is desired to operate the actuator to release the brakes, the pedal operated valve PV is closed and the pedal P is then in elevated position as shown in FIG. 1. It is now necessary to vent chamber 6 and apply air pressure to chamber 7 to move the diaphragm 8 and rod 16 to brake releasing position and at the same time compress spring 10 in chamber 6. This operation is effected as follows. With the closing of the pedal valve PV to shut off air pressure through line V1 to normally closed relay valve NC which was previously open during the application of the brakes, the valve NC now closes to shut off flow at arrow 1b in FIG. 2 from pressure line A and through valve NC and line A1 to quick relief valve R2. Due to the absence of pressure from line A1, the valve R2 now closes its intake indicated by the arrow 1d in FIG. 2 and opens its exhaust indicated by the arrow 1c in FIG. 1, thereby venting chamber 6 to atmosphere. At the same time the valves NC and R2 are actuated to cause venting of chamber 6, the normally open valve NO is restored to open position by reason of the absence of pedal valve control pressure in line V2. Upon the valve NO being restored to open position, pressure from line A passes through port indicated by arrow 1e in FIG. 1, line A2 to quick relief valve R1 which in response to this pressure opens its intake indicated by the arrow 1f in FIG. 1 and closes its exhaust indicated by the arrow 1g in FIG. 2, thereby introducing into chamber 7 air pressure sufficient to move the diaphragm 8 and rod 16 into brake releasing position and so maintain this position with the spring 10 compressed.

If desired, a pressure regulating valve PR may, as here shown, be operated in line A to reduce the pressure flowing to normally open valve NO and thence through pressure relief valve R1 into chamber 7. This pressure regulator will limit the pressure to a predetermined value, for example, 70 pounds, or such other reduced pressure that is sufficient to move the diaphragm 8 and piston rod into brake releasing position and compress spring 10.

It should be noted that the conventional relay valves NC and NO may be provided as is usual with exhaust ports which vent from these valves the air pressure delivered thereto through the pedal valve control lines V1 and V2. Accordingly, the exhaust for valve NC is indicated by the arrow 1h, whereas the exhaust from valve NO is indicated by the arrow 1j. It should also be noted that the pedal operated valve PV may be equipped with an exhaust port indicated by the arrow 1j in FIG. 1 to also relieve pressure from valves NC and NO and lines V1 and V2 after pressure from such lines have actuated the valves.

The conventional quick relief valves R1 and R2 as is customary have exhaust ports indicated by the arrows E and E' and which after the valves R1 and R2 have been actuated by line pressure from lines A1 and A2, and upon cessation of flow through such lines will vent air from the relief valves.

It should be noted that the safety actuator of this invention readily lends itself to control by any suitable well known emergency relief valve and its compressed air circuitry that is employed in the usual manner for operation in the cab of the vehicle in which the actuator is installed, for releasing the brakes in the event they have been set by the spring means as a result of failure of air pressure in the system.

While specific structural details have been shown and described, it should be understood that changes and alterations may be resorted to without departing from the spirit of the invention as defined in the appended claims.

I claim:

1. A safety brake actuator comprising: a housing; a movable member dividing said housing into a brake applying chamber and a brake releasing chamber and movable therebetween into brake applying and brake releasing positions; a brake actuating rod extending into said brake releasing chamber and operatively connected with said movable member for movement therewith into said brake applying and brake releasing positions; spring means operable in said brake applying chamber for moving said movable member and said rod into said brake applying position in the absence of fluid pressure in said brake releasing chamber; fluid pressure responsive means operable to vent said brake applying chamber and to introduce fluid under pressure into said brake releasing chamber to move said movable member and said rod into said brake releasing position and compress said spring means, as well as operable to vent said brake releasing chamber and to introduce fluid under pressure into said brake applying chamber to move with the aid of said spring means said movable member and said rod into said brake applying position; said fluid pressure responsive means including a quick relief valve for each of said chambers; a normally open fluid pressure responsive relay valve for directing fluid for operating one of said relief valves; a normally closed fluid pressure responsive relay valve for directing fluid for operating the other of said relay valves; a manually operable valve; and circuit means interconnecting said manually operable valve with said relay valves and said relief valves so that in response to operation of said manually operable valve said relay and relief valves will be operated in the aforementioned manner.

2. A safety brake actuator comprising: a housing having a pair of housing sections; a diaphragm; means releasably clamping said sections together with said diaphragm disposed therebetween and dividing the housing into two fluid-tight chambers; a brake actuating rod connected with said diaphragm and movable through one of said chambers into brake applying and brake releasing positions in response to movement of said diaphragm; spring means in the other of said chambers operable to move said diaphragm and rod into said brake applying position; fluid pressure actuated means for introducing fluid under pressure into said one chamber and for venting said other chamber to effect movement of said diaphragm for compressing said spring and maintaining said diaphragm and rod in brake releasing position, as well as for introducing fluid under pressure into said other chamber and venting said one chamber for effecting movement of said diaphragm and rod into brake applying position in response to said fluid pressure and the force of said spring means; said spring means being operable to move said diaphragm and rod into brake applying position in the event of failure of the fluid pressure in either of said chambers; said fluid pressure actuated means including a normally open relay valve and a normally closed relay valve; a quick relief valve subject to operation by said normally open relay valve; and a quick relief valve subject to operation by said normally closed relay valve; a manually operable valve; and fluid pressure circuitry connecting said manually operable valve with said relay valves and said relief valves for actuating said relay valves and said relief valves in the manner herein stated.

References Cited by the Examiner
UNITED STATES PATENTS

| | | | |
|---|---|---|---|
| 1,548,394 | 8/1925 | Sumner | 303—71 |
| 2,132,914 | 10/1938 | Fitch | 303—71 |
| 2,724,410 | 11/1955 | Vorech | 92—101 |
| 3,020,094 | 2/1962 | Murty | 303—9 |
| 3,163,092 | 12/1964 | Masser | 303—71 |

MARTIN P. SCHWADRON, *Primary Examiner.*

EDGAR W. GEOGHEGAN, *Examiner.*

P. T. COBRIN, *Assistant Examiner.*